United States Patent [19]
Rice

[11] Patent Number: 5,988,593
[45] Date of Patent: Nov. 23, 1999

[54] WATER FAUCET WITH SPOUT TO CONTROL WATER FLOW AND METHOD THEREFOR

[76] Inventor: Hiram Allen Rice, 1840 Myrtle Island Dr., Las Vegas, Nev. 89117

[21] Appl. No.: 09/131,211

[22] Filed: Aug. 7, 1998

[51] Int. Cl.[6] .................................................. F16K 31/00
[52] U.S. Cl. .......................... 251/354; 251/349; 251/353
[58] Field of Search .................................... 251/354, 349, 251/351, 353, 339, 228

[56] References Cited

U.S. PATENT DOCUMENTS

| | | | |
|---|---|---|---|
| 703,103 | 6/1902 | Weber | 251/354 |
| 3,570,525 | 3/1971 | Borsum et al. | 251/354 |
| 3,765,455 | 10/1973 | Countryman | 251/349 |
| 4,356,998 | 11/1982 | Bach et al. | 251/354 |

FOREIGN PATENT DOCUMENTS

| | | | |
|---|---|---|---|
| 7721 | of 1906 | United Kingdom | 251/354 |

*Primary Examiner*—David J. Walczak
*Attorney, Agent, or Firm*—Harry M. Weiss; Jeffrey Weiss; Paul W. Davis

[57] ABSTRACT

A water faucet and method therefor includes a spout for the water faucet which is used to control whether water is dispensed from the water faucet or not dispensed therefrom. The spout of the water faucet in its natural, untouched position functions to prevent water from flowing through the water faucet for external use. If the spout is raised or lowered, there is a flow of water through the water faucet because of a valve located within the spout and a base member holding the spout at a bottom portion thereof.

16 Claims, 2 Drawing Sheets

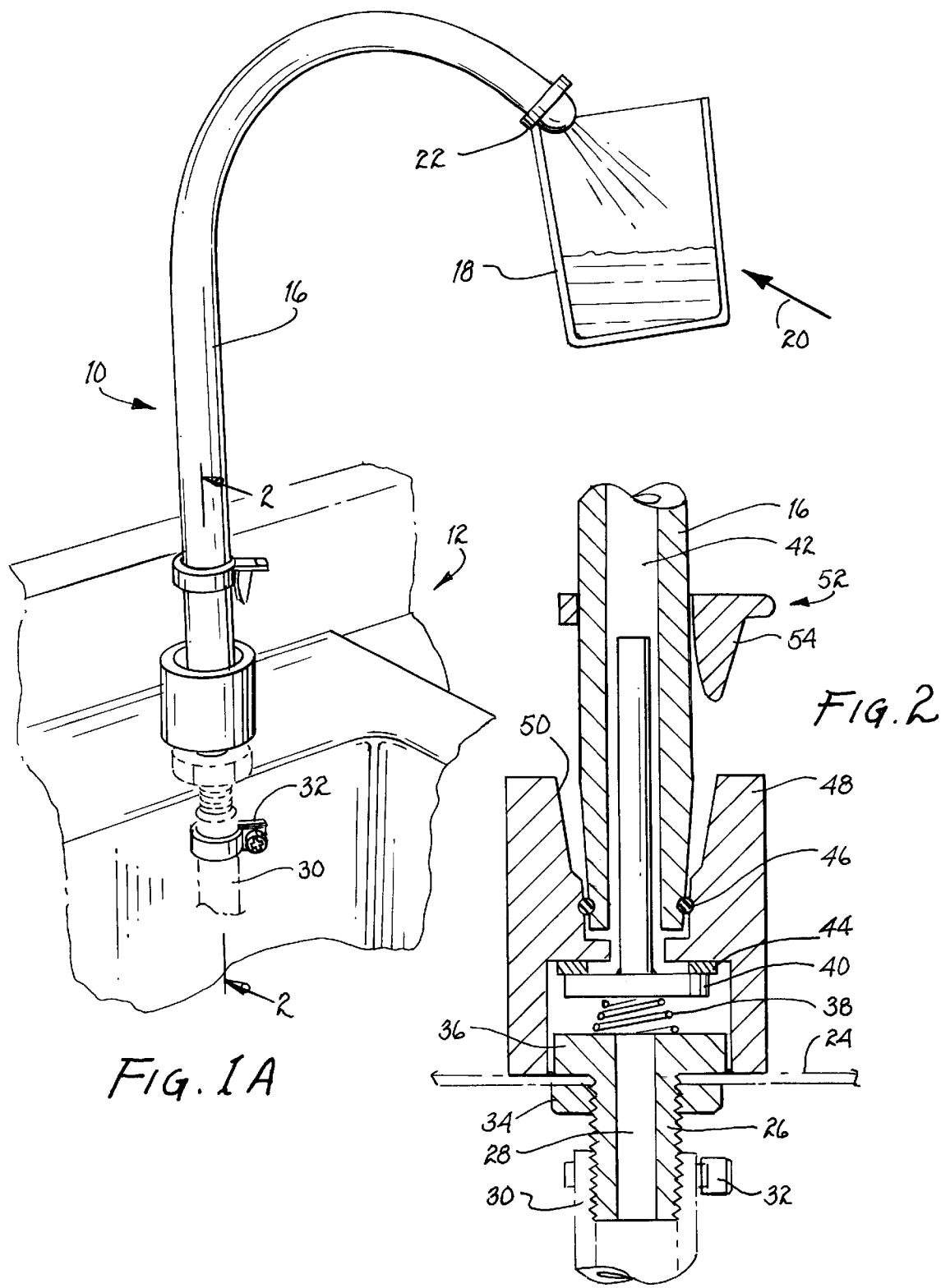

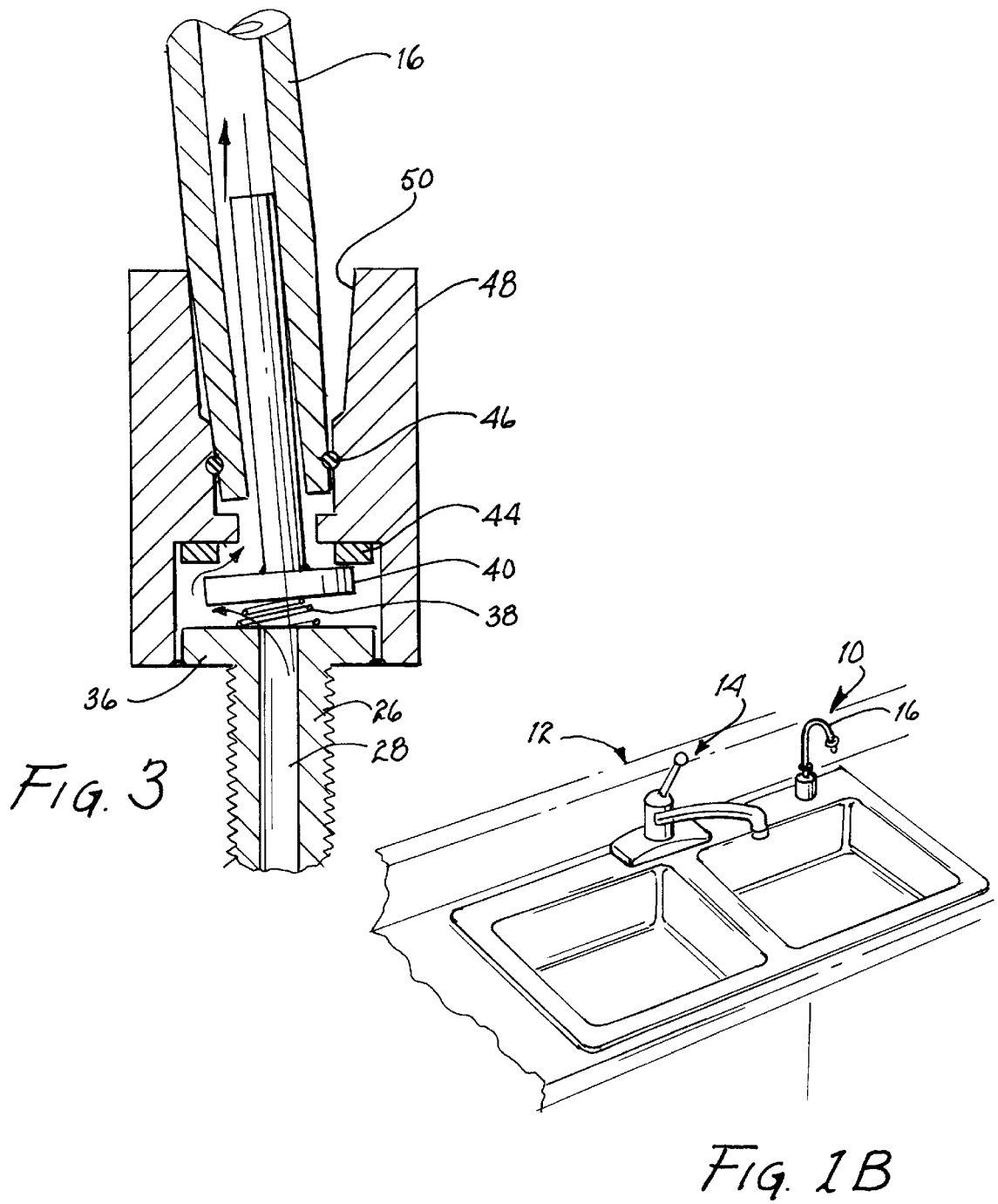

WATER FAUCET WITH SPOUT TO CONTROL WATER FLOW AND METHOD THEREFOR

FIELD OF THE INVENTION

This invention relates to water faucets and methods of controlling water flow through the water faucets and, more particularly, to an improved water faucet and method of controlling water flow therethrough using the water faucet's spout.

BACKGROUND OF THE PRIOR ART

In the past, various water faucets have been produced and used by consumers in their offices or homes which have used different techniques to control water flow through the water faucet spouts. Most of the water faucets that were manufactured and sold in the past utilized both hot and cold, separate water control valve members in the form of water control units or knobs that were individually controlled to turn on or off the flow of water through the spout of the water faucet. These water control units or knobs were usually located spaced from the water faucet's spout in a convenient location on or adjacent to the sink to permit easy access thereto and use thereof by the hands of a person desiring to turn on (and subsequently off) the water faucet.

In order to facilitate the operation of controlling water flow through a water faucet and to eliminate the use of two separate water control units or knobs, a single water control unit or knob was developed which was generally centrally disposed adjacent to, but separate from the spout of the water faucet. One type of such a single water control unit or knob is known as the MOEN water controlled water faucet system. The MOEN water faucet permits water to flow out of the faucet when the single control unit or knob is elevated and returning the knob to its original low position causes the water flow out of the faucet to cease. Hot or cold water selection is achieved by rotation of the single control unit or knob to the right for cold water or to the left for hot water.

The use of the prior art water faucet systems including the MOEN water faucet system requires the use of both hands to turn the water faucet and simultaneously position a glass, cup or other container under the spout of the prior art water faucet system to receive water therefrom.

In recent years, people have become greatly concerned about obtaining purified or filtered water for drinking or other purposes i.e. food preparation, etc. because of possible contamination of water sources used to deliver water to consumers thereof. For example, pollutants from industrial plants near a water source that is going to a large population area have created great concerns to a health conscious public.

As a result, a significant water treatment industry has been developed to provide people with purified or filtered water. Carbon and other types of filtration systems have been developed to insure delivery of high quality water to consumers. Accordingly, water systems in homes and businesses have been created or modified to incorporate water filtration or purification devices to significantly increase the quality of the water that is to be used.

For these purified or filtered water systems, special faucets were developed to produce the external flow of water to be used by the consumers. These special faucets generally did not have both hot and cold water options from the same faucet, but were primarily concerned with the delivery of high purity water.

The subject invention is primarily directed to an improved water faucet especially useful for producing a flow of purified or filtered water.

Accordingly, a need existed for a much simpler water faucet system especially useful for delivering high purity water that is capable of operation using only one hand to control the flow of water, that would permit the flow of water out of the water faucet to be stopped by merely removing a person's hand from contact with the water control unit of the water faucet system, and that would even permit a person to use the same one hand to both turn the water on and to simultaneously pour water into a cup, glass or container.

A major problem with prior art water faucet systems was the fact that a positive action was needed to both turn on and turn off the water faucet. Consequently, we have all seen situations at various times and at different locations where the person turning on the water faucet forgot to turn it off thereby resulting in a loss of significant amounts of water. Since water is a valuable asset and, in some areas, a very scarce and precious commodity, it is extremely important to protect this commodity by insuring that a water faucet is turned off after a person's use thereof.

Thus, there is a great need for a water faucet systems that is naturally or automatically turned off when a person discontinues use of the water system to avoid continued flow and loss of water and thereby effecting significant water savings. Such a water faucet system operable by only one hand of a person is highly advantageous and desirable in addition to being simple to use.

BRIEF DESCRIPTION OF THE PREFERRED EMBODIMENTS

In accordance with one embodiment of this invention, a water faucet is disclosed which comprises in combination; spout means having a conduit located therein for providing a flow of water for external use when a pressure in an upward or downward direction is applied to cause the spout means to be tilted or respectively raised of lowered; and base support means coupled to the spout means for supporting the spout means and for providing a source of water to the spout means. The water faucet includes valve means coupled to both the spout means and the base support means and having a stem portion located within the conduit of the spout means and a valve member connected to the stem portion and located within the base support means. The valve means preferably has a substantially T-shaped configuration and the T-shaped configuration of the valve means is inverted into an upside down T-shaped configuration. Also included are spout locking means located around an outer surface portion of the spout means for engagement with a portion of the base support means to place the spout means in a water flow on position to provide a flow of water for external use. Further included are engagement means located adjacent to an external opening of the spout means for engaging a container that is to receive water from the spout means to permit water from the spout means to flow into the container when the container is lifted when in contact with the engagement means to raise the spout means.

In accordance with another embodiment of this invention, a method is disclosed for providing water flow through a water faucet which comprises the steps of: providing spout means having a conduit located therein for providing a flow of water for external use when a pressure in an upward or downward direction is applied to cause the spout means to be tilted or respectively raised or lowered; and providing base support means coupled to the spout means for supporting the spout means, and for providing a source of water to the spout means. The water faucet includes valve means coupled to both the spout means and the base support means and having a stem portion located within the conduit of the spout means and a valve member connected to the stem portion and located within the base support means. The valve means preferably has a substantially T-shaped configuration and the T-shaped configuration of the valve means is inverted in to an upside down T-shaped configuration. Also included are spout locking means located around an outer surface portion of the spout means for engagement with a portion of the base support means to place the spout means in a water flow on position to provide a flow of water for external use. Further included are engagement means located adjacent to an external opening of the spout means for engaging a container that is to receive water from the spout means to permit water from the spout means to flow into the container when the container is lifted when in contact with the engagement means to raise the spout means.

The foregoing and other objects, features and advantages of this invention will be apparent from the following more particular description of the preferred embodiments of the invention as illustrated in the accompanying drawings.

BRIEF DESCRIPTION OF THE DRAWINGS

FIG. 1A is a perspective view illustrating the water faucet of this invention including a spout thereof delivering water to a container.

FIG. 1B is a perspective view of the location of the water faucet of FIG. 1A on a sink and adjacent to a conventional water faucet.

FIG. 2 is a sectional view taken on the line 2—2 of FIG. 1A depicting the bottom portion of the spout of FIG. 1A, a base support member for the spout and the positioning of the various components of the water faucet when the water flow is prevented.

FIG. 3 is a sectional view similar to FIG. 2 but depicting the positioning of the various components of the water faucet when water is flowing through the water faucet when the spout is tilted or either raised or lowered.

DESCRIPTION OF THE SPECIFICATION

Referring to FIGS. 1A and 1B, a water faucet 10 is shown which is preferably useful as a source of purified or filtered water and the water faucet 10 is preferably mounted on a sink 12 by attachment means shown in FIG. 1A and more specifically described with particular reference to FIG. 2. Preferably, the water faucet 10 is used in conjunction with a conventional type of water faucet 14 as shown in FIG. 1B which dispenses non-filtered water. The water faucet 10 comprises a spout 16 which performs the function of dispensing purified or filtered water into a glass or container 18 (see FIG. 1A). The glass or container 18 is held by a person's hand (not shown) is elevated upwardly in the direction of arrow 20 thereby raising the spout 16 because a top left portion of the container 18 engages a preferably ring shaped member 22 on a lower surface portion thereof (as shown in FIG. 1A). The operation of the spout 16 when raised or lowered to provide a flow of water through and out the spout 16 is described below with reference to FIGS. 2 and 3. The materials used for the various elements of the water faucet 10 can be selected, as desired, for durability and/or visual appearances and different colors can be utilized to provide appropriate color combinations with the sink, room, etc. Obviously, various metals and/or plastics may be used depending upon requirements for quality, looks, and long lasting performance.

Referring to FIGS. 2 and 3, FIG. 2 is a cross-sectional view of a salient portion of the water faucet 10 of FIG. 1A taken on the line 2—2 of FIG. 1A. FIG. 2 depicts the position of the water faucet 10 in its closed position which is the position where no water is permitted to flow therethrough and out of the spout 16. As can be seen with reference to FIG. 2, a top portion 24 of the sink 12 (see FIGS. 1A and 1B) has an opening therein which is used for attachment purposes to hold the water faucet 10 (see FIGS. 1A and 1B) in position on the sink 12. A preferably threaded stud member 26 is located in the opening in the sink 12 and provides a preferably rigid conduit because of opening 28 for the flow of water from a conduit 30 carrying water from a source of water such as a water filter or water purification source (not shown) to the spout 16. The conduit 30 is preferably connected to the stud member 26 by means of a C-clamp 32 that surrounds an end portion of the conduit 30 and serves, because of the clamping pressure of the C-clamp 32, to connect the conduit 30 to the stud member 26. Other connection type devices, if desired, can be used to achieve this connection between the stud member 26 and the conduit 30. Preferably, the stud member 26 is made of metal while the connection conduit is made of plastic. A locking nut 34, having an internally threaded opening to permit rotational engagement of the locking nut 34 with the externally threaded stud member 26, serves to lock in place the stud member 26 in the opening within the top portion of the sink. The stud member 26 is preferably configured to have a flange portion 36 that extends above the top portion of the sink 12 as shown in FIG. 2 thereby providing, with the locking nut 34, a tight clamping of the water faucet 10 to the top portion 24 of the sink 12. Located above the top portion of the flange portion 36 of the stud member 26 is a coil or spring 38 preferably made of stainless steel (however, other materials can be used if desired). The top portion of the stainless steel spring 38 is in contact with a bottom surface portion of an inverted solid T-shaped valve member 40 that is located within the opening 42 of the spout 16 at a lower portion thereof. The inverted T-shaped valve member 40 functions to either prevent water from flowing through the water faucet 10 when it is in the position shown in FIG. 2 or to permit water to flow through and out the water faucet 10 when it is in the position shown in FIG. 3. In the position shown in FIG. 2, the inverted T-shaped valve member 40 is biased upwardly by the spring 38 so that the upper surface portion (opposite the bottom surface portion of the inverted T-shaped valve member 40 that is in contact with the spring 38) seats (as a valve) against washer (or gasket) 44 thereby (because the inverted T-shaped member 10 is solid) preventing water from flowing through the water faucet 10 and out the spout 16.

However, if either an upward or downward force (such as by a person's hand (not shown) or by the container 18 as shown in FIG. 1A) is directly applied to the spout 16, then the inverted T-shaped valve member 40 is pivoted or turned (as shown in FIG. 3) to thereby permit water to flow through the water faucet 10 (around the bottom portion of the inverted T-shaped valve member 40) and out the spout 16 for external use such as to flow into the container 18 (shown in FIG. 1A). The illustration of FIG. 3 depicts the inverted T-shaped valve member 40 pivoted or turned in one direction for when an upward force is applied to the spout 16 (as shown in FIG. 1A) however, the inverted T-shaped valve member 40 is pivoted or turned in the opposite direction (not shown) when a downward force is applied to the spout 16 thereby permitting water to flow around the other side portion of the bottom portion of the inverted T-shaped valve member 40. Washer or gasket 46 serves to prevent water from flowing up the outside surface of the spout 16 and also to provide a flexible connection between the spout 16 (at a bottom external surface portion thereof) and the interior surface of a base support member 48. The base support member 48 has an outwardly flared (upper interior) surface portion 50 which permits the bottom portion of the spout 16 to be pivoted as shown in FIG. 3. Preferably, the exterior portion of the flange member 36 of the stud member 26 is spot welded or sonic welded to a lower interior portion of the base support member 48.

Spout locking means 52 (see FIG. 2) in the configuration of a slideable ring that is located above the base support member 48 is used to be moved or lowered in order to permit wedge shaped member 54 to be wedged into the upper cavity of the base support member 48 between the spout 16 and the outwardly flared wall 50 of the upper cavity to thereby cause the spout 16 to be locked in the water flow on position of FIG. 3. In this manner, the spout 16 will continue to dispense water because it will be locked in a water flow on position. If desired, the spout locking means 52 can be rotated 180 degrees prior to being lowered in the spout locking position if it is desired to tilt the spout 16 into a water flow on position 180 degrees opposite from the spout tilted (water flow on) position depicted in FIG. 3.

It should be understood that the water faucet 10 can be made of various materials, as desired, such as for lower cost plastic, or for better looks, brass, chrome plated brass or other metal, stainless steel, etc. Also the dimensions can be varied as desired, such as, for example, the outer dimension of the base support member 48 can be about 1.25 inches and it can be about 1.50 inches in height, the lower cavity of the base support member 48 can be about seven eighths of an inch (inner diameter) and have a depth of about five eighths of an inch with the rubber washer 44 being about seven eighths of an inch (outer diameter). The opening 25 in the stud member 26 is about one eighth of an inch.

While the invention has been particularly shown and described with reference to the preferred embodiments thereof, it will be understood by those skilled in the art that the foregoing and other changes in form and details may be made therein without departing from the spirit and scope of the invention.

What is claimed is:

1. A water faucet comprising, in combination:
   spout means having a conduit located therein for providing a flow of water for external use when a pressure is applied to cause said spout means to be tilted; and
   base support means coupled to said spout means for supporting said spout means and for providing a source of water to said spout means;
   spout locking means located around an outer surface portion of said spout means for engagement with a portion of said base support means to place said spout means in a water flow on position to provide a flow of water for external use.

2. The water faucet of claim 1 including valve means coupled to both said spout means and said base support means and having a stem portion located within said conduit of said spout means and a valve member connected to said stem portion and located within said base support means.

3. The water faucet of claim 2 wherein said valve means has a substantially T-shaped configuration.

4. The water faucet of claim 3 wherein said T-shaped configuration of said valve means is inverted into an upside down T-shaped configuration.

5. The water faucet of claim 1 including engagement means located adjacent to an external opening of said spout means for engaging a container that is to receive water from said spout means to permit water from said spout means to flow into said container when said container is lifted when in contact with said engagement means to raise said spout means.

6. The water faucet of claim 1 wherein said base support means comprising a substantially cylindrical shaped member having a central frusto-conical shaped opening in an upper portion thereof and a central cylindrical shaped opening in a bottom portion thereof, an opening located in said base support means in communication with both said central frusto-conical shaped opening and said central cylindrical shaped opening, a bottom portion of said spout means located in said frusto-conical shaped opening of said base support means and pivotable between portions of outwardly flared sides of said central frusto-conical shaped opening in said base support means.

7. A water faucet comprising, in combination:
   spout means having a conduit located therein for providing a flow of water for external use when a pressure is applied to cause said spout means to be tilted; and
   base support means coupled to said spout means for supporting said spout means and for providing a source of water to said spout means; said base support means comprising a substantially cylindrical shaped member having a central frusto-conical shaped opening in an upper portion thereof and a central cylindrical shaped opening in a bottom portion thereof, an opening located in said base support means in communication with both said central frusto-conical shaped opening and said central cylindrical shaped opening, a bottom portion of said spout means located in said frusto-conical shaped opening of said base support means and pivotable between portions of outwardly flared sides of said central frusto-conical shaped opening in said base support means, including valve means coupled to both said spout means and said base support means and having a stem portion located within said conduit of said spout means and a valve member connected to said stem portion and located within said base support means, said valve means having a substantially T-shaped configuration, said T-shaped configuration of said valve means is inverted into an upside down T-shaped configuration, said valve member of said valve means being located in said central cylindrical shaped opening in said base support means, said stem portion of said valve means extending through said opening in communication with said central frusto-conical shaped opening and said central cylindrical shaped opening, said valve member seating against a circular portion of said base support means surrounding the bottom of said opening in communication with said central frusto-conical shaped opening and said central cylindrical shaped opening to prevent the flow of water through said conduit of said spout means, said valve member being pivotable to permit the flow of water through said conduit of said spout means when said spout means is tilted, and spring means located below said valve member for providing a force to bias said valve member to seat against said circular portion of said base support means to prevent the flow of water through said conduit of said spout means.

8. The water faucet of claim 7 including spout locking means located around an outer surface portion of said spout means for engagement with a portion of said base support means to place said spout means in a water flow on position to provide a flow of water for external use, and also including engagement means located adjacent to an external opening of said spout means for engaging a container that is to receive water from said spout means to permit water from said spout means to flow into said container when said container is lifted when in contact with said engagement means to raise said spout means.

9. A method of providing water flow through a water faucet comprising the steps of:
using spout means having a conduit located therein for providing a flow of water for external use when a pressure is applied to cause said spout means to be tilted; and
coupling base support means to said spout means for supporting said spout means and for providing a source of water to said spout means; locating spout locking means around an outer surface portion of said spout means for engagement with a portion of said base support means to place said spout means in a water flow on position to provide a flow of water for external use.

10. The method of claim 9 including providing valve means coupled to both said spout means and said base support means and having a stem portion located within said conduit of said spout means and a valve member connected to said stem portion and located within said base support means.

11. The method of claim 10 wherein said valve means has a substantially T-shaped configuration.

12. The method of claim 11 wherein said T-shaped configuration of said valve means is inverted into an upside down T-shaped configuration.

13. The method of claim 9 including providing engagement means located adjacent to an external opening of said spout means for engaging a container that is to receive water from said spout means to permit water from said spout means to flow into said container when said container is lifted when in contact with said engagement means to raise said spout means.

14. The method of claim 9 wherein said base support means comprising a substantially cylindrical shaped member having a central frusto-conical shaped opening in an upper portion thereof and a central cylindrical shaped opening in a bottom portion thereof, an opening located in said base support means in communication with both said central frusto-conical shaped opening and said central cylindrical shaped opening, a bottom portion of said spout means located in said frusto-conical shaped opening of said base support means and pivotable between portions of outwardly flared sides of said central frusto-conical shaped opening in said base support means.

15. A method of providing water flow through a water faucet comprising the steps of:
using spout means having a conduit located therein for providing a flow of water for external use when a pressure is applied to cause said spout means to be tilted;
and coupling base support means to said spout means for supporting said spout means and for providing a source of water to said spout means; said base support means comprising a substantially cylindrical shaped member having a central frusto-conical shaped opening in an upper portion thereof and a central cylindrical shaped opening in a bottom portion thereof, an opening located in said base support means in communication with both said central frusto-conical shaped opening and said central cylindrical shaped opening, a bottom portion of said spout means located in said frusto-conical shaped opening of said base support means and pivotable between portions of outwardly flared sides of said central frusto-conical shaped opening in said base support means, including providing valve means coupled to both said spout means and said base support means and having a stem portion located within said conduit of said spout means and a valve member connected to said stem portion and located within said base support means, said valve means having a substantially T-shaped configuration, said T-shaped configuration of said valve means is inverted into an upside down T-shaped configuration, said valve member of said valve means being located in said central cylindrical shaped opening in said base support means, said stem portion of said valve means extending through said opening in communication with said central frusto-conical shaped opening and said central cylindrical shaped opening, said valve member seating against a circular portion of said base support means surrounding the bottom of said opening in communication with said central frusto-conical shaped opening and said central cylindrical shaped opening to prevent the flow of water through said conduit of said spout means, said valve member being pivotable to permit the flow of water through said conduit of said spout means when said spout means is tilted, and spring means located below said valve member for providing a force to bias said valve member to seat against said circular portion of said base support means to prevent the flow of water through said conduit of said spout means.

16. The method of claim 15 including providing spout locking means located around an outer surface portion of said spout means for engagement with a portion of said base support means to place said spout means in a water flow on position to provide a flow of water for external use, including providing engagement means located adjacent to an external opening of said spout means for engaging a container that is to receive water from said spout means to permit water from said spout means to flow into said container when said container is lifted when in contact with said engagement means to raise said spout means.

* * * * *